(12) United States Patent
Yoo et al.

(10) Patent No.: US 10,986,665 B2
(45) Date of Patent: Apr. 20, 2021

(54) QUASI-COLOCATION FOR LBT

(71) Applicant: QUALCOMM Incorporated, San Diego, CA (US)

(72) Inventors: Taesang Yoo, San Diego, CA (US); Xiaoxia Zhang, San Diego, CA (US); Jing Sun, San Diego, CA (US); Aleksandar Damnjanovic, Del Mar, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 16/046,500

(22) Filed: Jul. 26, 2018

(65) Prior Publication Data
US 2019/0090273 A1 Mar. 21, 2019

Related U.S. Application Data
(60) Provisional application No. 62/559,171, filed on Sep. 15, 2017.

(51) Int. Cl.
| | |
|---|---|
| *H04W 74/08* | (2009.01) |
| *H01Q 1/24* | (2006.01) |
| *H01Q 21/00* | (2006.01) |
| *H04L 12/26* | (2006.01) |
| *H04W 72/08* | (2009.01) |
| *H04W 88/08* | (2009.01) |

(52) U.S. Cl.
CPC ........ *H04W 74/0808* (2013.01); *H01Q 1/246* (2013.01); *H01Q 21/00* (2013.01); *H04L 43/16* (2013.01); *H04W 72/082* (2013.01); *H04W 74/0816* (2013.01); *H04W 88/08* (2013.01)

(58) Field of Classification Search
CPC ...... H01Q 1/246; H01Q 21/00; H04L 5/0048; H04L 5/10; H04L 43/16; H04W 72/082; H04W 74/0808; H04W 74/0816; H04W 88/08
See application file for complete search history.

(56) References Cited

U.S. PATENT DOCUMENTS
2016/0192395 A1* 6/2016 Yoo ................. H04L 5/0048
370/329

OTHER PUBLICATIONS
Catt, "Discussion on QCL for NR", R1-1708888, 3GPP TSG RAN WG1 Meeting #89, May 15-19, 2017 (Year: 2017).*

(Continued)

*Primary Examiner* — Khoa Huynh
(74) *Attorney, Agent, or Firm* — Qualcomm Incorporated

(57) ABSTRACT

Quasi-colocation (QCL) for listen before talk (LBT) procedures is disclosed. A base station having a plurality of antennas may identify one or more groups of QCL antennas. Various aspects provide for different rules defining the QCL relationship, such as base on interference experienced by the antennas, a physical or logical connection of the antennas and LBT coupling, or synchronization. QCL may further be determined across multiple shared channels, such as based on frequency separation or frequency band of the channels. Once grouped as QCL, the base station performs the LBT procedure to reserve access to the one or more shared communication channels. If the LBT is successful, the base station may then transmit a channel reservation preamble on the shared communication channels in response.

31 Claims, 7 Drawing Sheets

(56) References Cited

OTHER PUBLICATIONS

CATT: "Discussion on QCL for NR", 3GPP Draft; R1-1708888, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15-19, 2017, May 10, 2017 (May 10, 2017), 4 Pages, XP051263439, Retrieved from the Internet: URL: http://www.3gpp.org/ftp/tsg_ran/WG1_RL1/TSGR1_89/Docs/ [retrieved on May 10, 2017].
International Search Report and Written Opinion—PCT/US2018/044132—ISA/EPO—dated Oct. 9, 2018.

\* cited by examiner

QUASI-COLOCATION FOR LBT

CROSS-REFERENCE TO RELATED APPLICATIONS

This application claims the benefit of U.S. Provisional Patent Application No. 62/559,171, entitled, "QUASI-COLOCATION FOR LBT," filed on Sep. 15, 2017, which is expressly incorporated by reference herein in its entirety.

BACKGROUND

Field

Aspects of the present disclosure relate generally to wireless communication systems, and more particularly, to quasi-colocation for listen before talk (LBT) procedures.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes identifying, by a base station having a plurality of antennas, one or more groups of quasi-colocated (QCL) antennas of the plurality of antennas, performing, by the base station, a listen before talk (LBT) procedure to reserve access to one or more shared communication channels, and transmitting, by the base station, a channel reservation preamble on the one or more shared communication channels in response to success of the LBT procedure.

In an additional aspect of the disclosure, a method of wireless communication includes identifying, by a base station having one or more antennas, at least one antenna of the one or more antennas is QCL across a plurality of shared communication channels, performing, by the base station, a LBT procedure to reserve access to the plurality of shared communication channels, and transmitting, by the base station, a channel reservation preamble on the plurality of shared communication channels in response to success of the LBT procedure.

In an additional aspect of the disclosure, an apparatus configured for wireless communication includes means for identifying, by a base station having a plurality of antennas, one or more groups of QCL antennas of the plurality of antennas, means for performing, by the base station, a LBT procedure to reserve access to one or more shared communication channels, and means for transmitting, by the base station, a channel reservation preamble on the one or more shared communication channels in response to success of the LBT procedure.

In an additional aspect of the disclosure, an apparatus configured for wireless communication includes means for identifying, by a base station having one or more antennas, at least one antenna of the one or more antennas is QCL across a plurality of shared communication channels, means for performing, by the base station, a LBT procedure to reserve access to the plurality of shared communication channels, and means for transmitting, by the base station, a channel reservation preamble on the plurality of shared communication channels in response to success of the LBT procedure.

In an additional aspect of the disclosure, a non-transitory computer-readable medium having program code recorded thereon. The program code further includes code to identify, by a base station having a plurality of antennas, one or more groups of QCL antennas of the plurality of antennas, code to perform, by the base station, a LBT procedure to reserve access to one or more shared communication channels, and code to transmit, by the base station, a channel reservation preamble on the one or more shared communication channels in response to success of the LBT procedure.

In an additional aspect of the disclosure, a non-transitory computer-readable medium having program code recorded thereon. The program code further includes code to identify, by a base station having one or more antennas, at least one antenna of the one or more antennas is QCL across a plurality of shared communication channels, code to perform, by the base station, a LBT procedure to reserve access to the plurality of shared communication channels, and code to transmit, by the base station, a channel reservation preamble on the plurality of shared communication channels in response to success of the LBT procedure.

In an additional aspect of the disclosure, an apparatus configured for wireless communication is disclosed. The apparatus includes at least one processor, and a memory coupled to the processor. The processor is configured to identify, by a base station having a plurality of antennas, one or more groups of QCL antennas of the plurality of antennas, to perform, by the base station, a LBT procedure to reserve access to one or more shared communication channels, and to transmit, by the base station, a channel reservation preamble on the one or more shared communication channels in response to success of the LBT procedure.

In an additional aspect of the disclosure, an apparatus configured for wireless communication is disclosed. The apparatus includes at least one processor, and a memory coupled to the processor. The processor is configured to identify, by a base station having one or more antennas, at least one antenna of the one or more antennas is QCL across a plurality of shared communication channels, to perform, by the base station, a LBT procedure to reserve access to the plurality of shared communication channels, and to transmit, by the base station, a channel reservation preamble on the plurality of shared communication channels in response to success of the LBT procedure.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
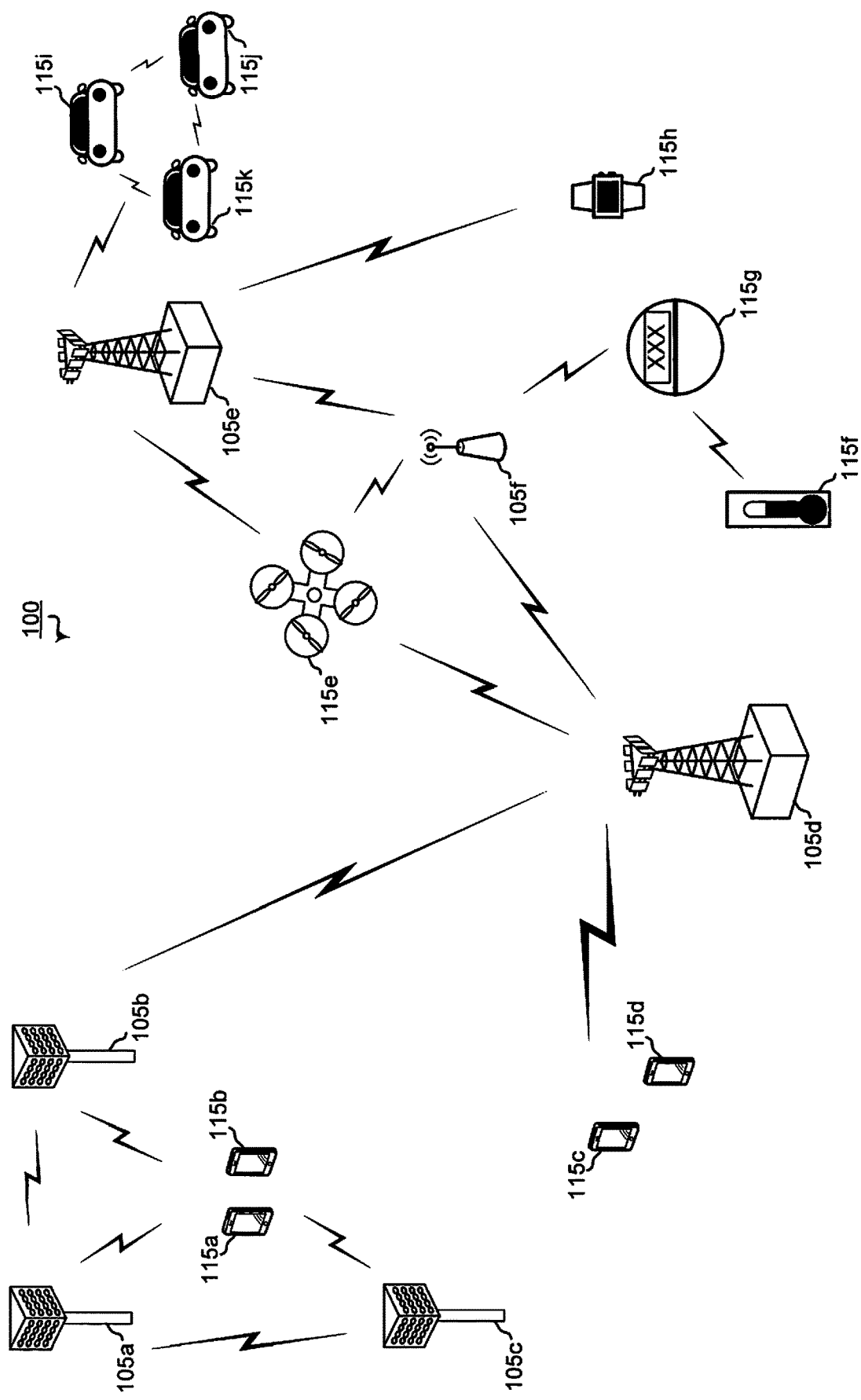
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
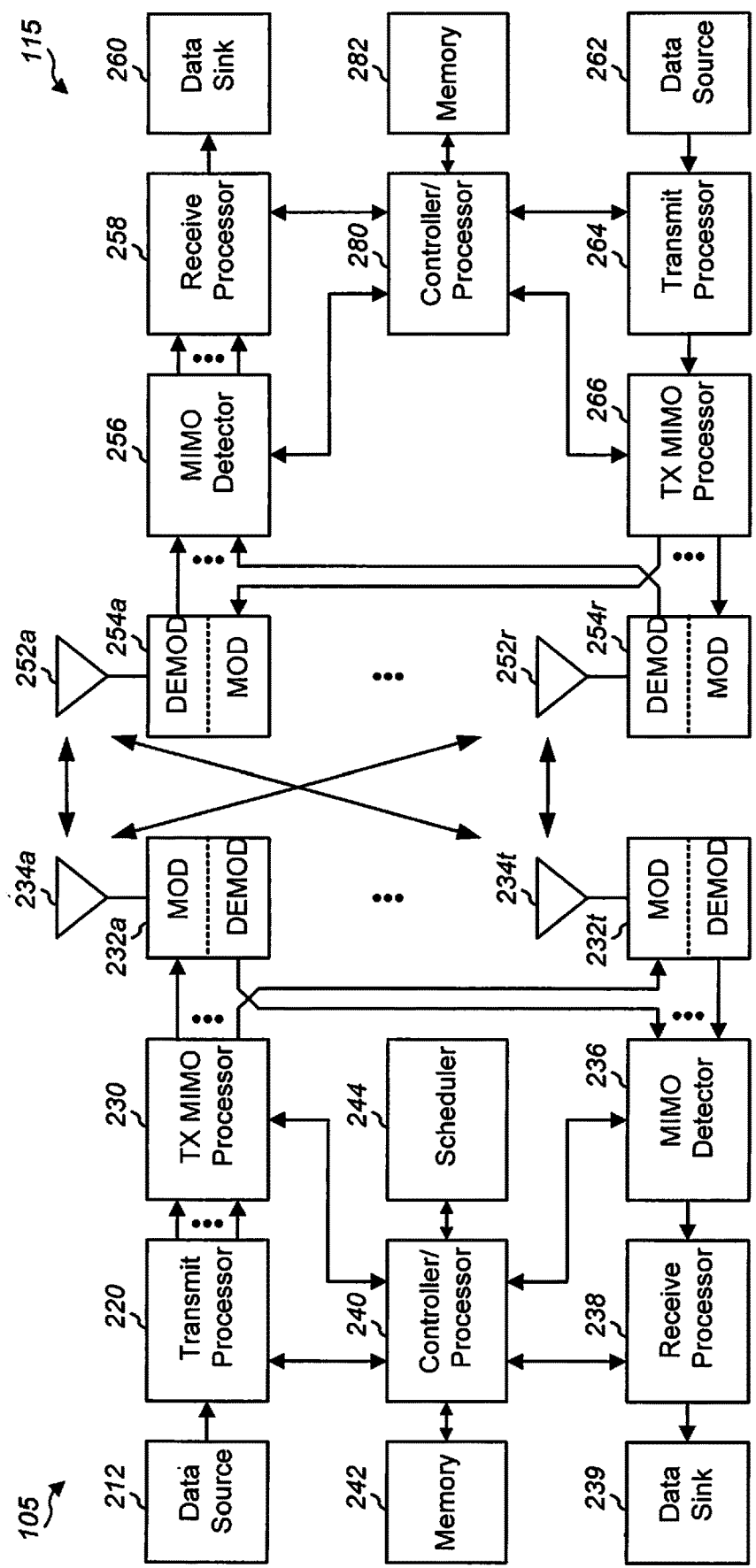
FIG. 2 is a block diagram illustrating a design of a base station and a UE configured according to one aspect of the present disclosure.

FIG. 2 shows a block diagram of a design of a base station 105 and a UE 115, which may be one of the base stations and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4A and 4B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
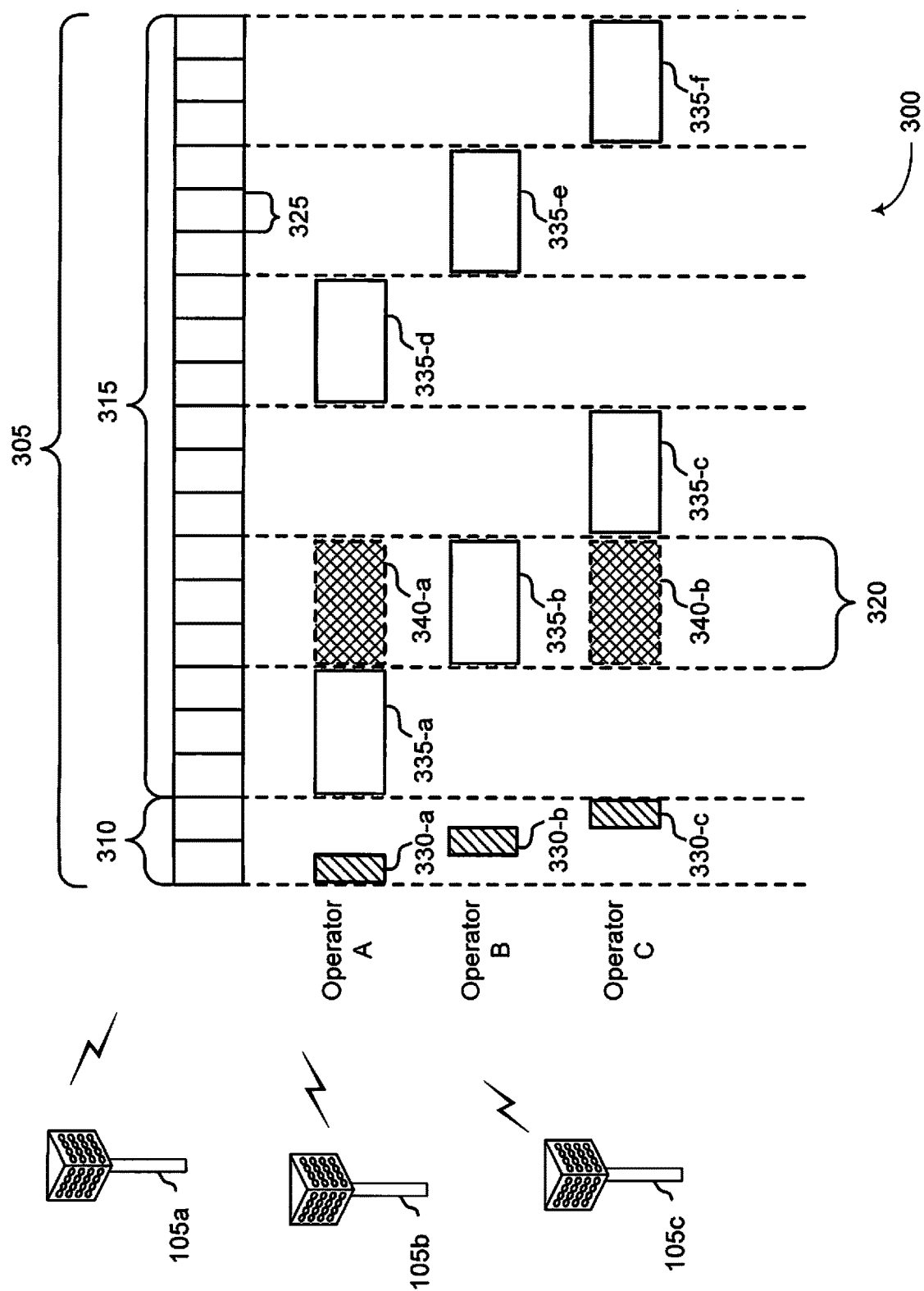
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305.

This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Quasi-colocation (QCL) is a concept that has been defined and applied in 3GPP for inferring channel conditions experienced on one antennas port to another antenna port based on some kind of relationship between the antenna ports. According to the formal definition, "Two antenna ports are said to be quasi co-located if properties of the channel over which a symbol on one antenna port is conveyed can be inferred from the channel over which a symbol on the other antenna port is conveyed." Application of the QCL concept in LTE and NR networks may relate to different types of reference signals (RS) (e.g., synchronization signals (SS), common reference signals (CRS), channel state information reference signals (CSI-RS), demodulation reference signals (DMRS), phase tracking reference signal (PTRS), tracking reference signal (TRS), sounding reference signals (SRS), etc.), between antennas within the same RS type, across different bandwidths, or for channel reciprocity. QCL may be defined differently with respect to different physical properties. These parameters include (1) average gain, (2) average delay, (3) Doppler shift, (4) delay spread, (5) Doppler spread, and (6) spatial receiver parameter(s). Typical use cases for QCL application include time/frequency tracking, channel estimation for demodulation, and uplink data/control transmission.

One area to be addressed involves treatment of distributed antennas for LBT procedures. Various aspects of the present disclosure provide for application of the QCL concept for LBT. One of the considerations for LBT with distributed antennas involves whether the multiple, distributed antennas are treated as single or separate entities for LBT. Considering a distance 'd' between the antennas, what threshold distance for 'd' dictates whether the antenna or group of antennas is to be treated as separate from the other antennas or group of antennas. Physically distributed antennas may also be driven by different clocks and not time-synchronized. In this case, issues may arise in defining energy detection (ED)/power detection (PD) when the sensing window across the antennas may not be aligned and a coherent combining across antennas may not be possible. Accordingly, various aspects of the present disclosure define the concept of QCL for the purpose of LBT to include interference characteristics and/or LBT correlations. As such, two antenna ports may be said to be QCL, for the purposes of LBT, if properties of the interference measured on one antenna port can be inferred from the interference measured on the other antenna port.

Figure 4:
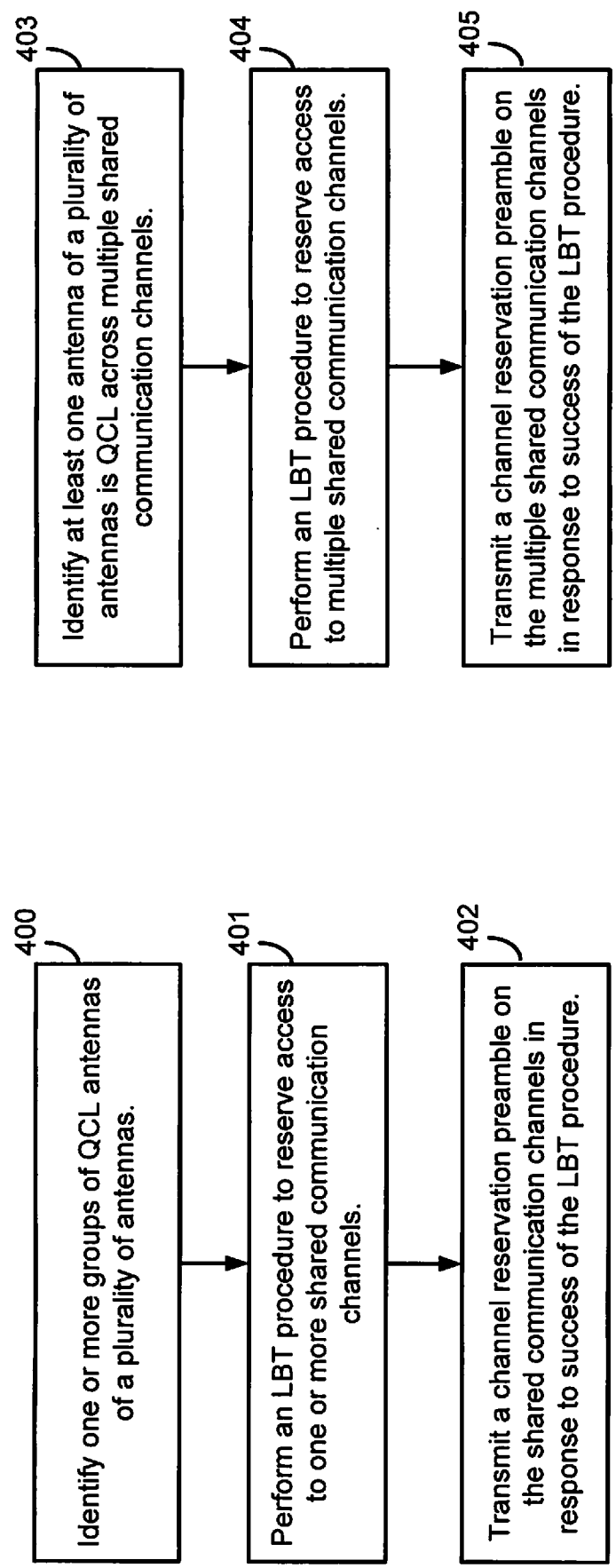
FIGS. 4A and 4B are block diagrams illustrating example block executed to implement aspects of the present disclosure.
Figure 7:
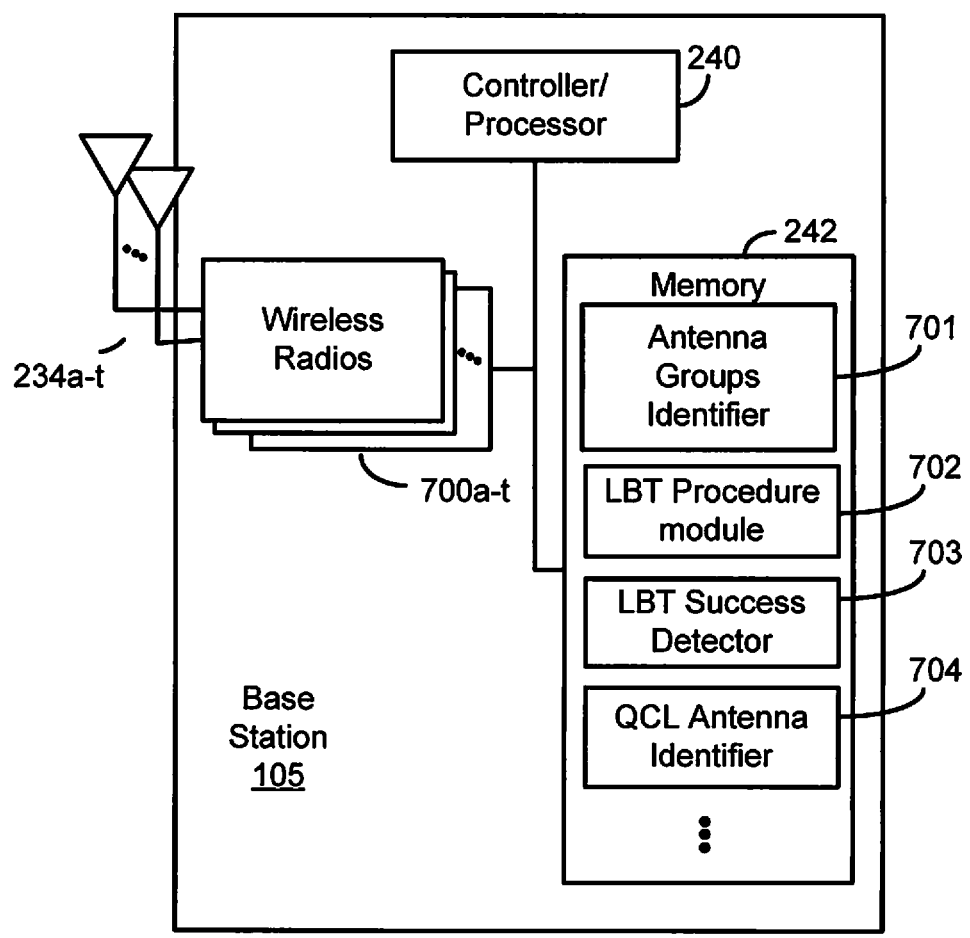
FIG. 7 is a block diagram illustrating an base station configured according to one aspect of the present disclosure.

FIG. 4A is a block diagram illustrating example blocks executed to implement one aspect of the present disclosure. The example blocks illustrated in FIGS. 4A and 4B will also be described with respect to base station 105, as illustrated in FIG. 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 700a-t and antennas 234a-t. Wireless radios 700a-t includes various components and hardware, as illustrated in FIG. 2 for base station 105, including modulator/demodulators 232a-t, MIMO detector 236, receive processor 238, transmit processor 220, and TX MIMO processor 230.

At block 400, a base station identifies one or more groups of QCL antennas of a plurality of antennas based on interference experienced by each antenna. For example, base station 105, under control of controller/processor 240, activates antenna groups identifier 701, stored in memory 242. The execution environment of antenna groups identifier 701 allows base station 105 to identify one or more groups of QCL antennas of a plurality of antennas based on interference experienced by each antenna. In such aspects, the base station may measure and analyze the interference experienced by each of its multiple antennas. For example, antenna groups identifier 701 may measure and analyze the interference experienced by each of antennas 234a-t. The base station forms one or more groups by grouping selected antennas according to a similar interference experience seen by these antennas. Accordingly, multiple sub-groups of antennas of the total number of antennas may be formed where each antenna in the group experiences a similar or definable interference.

At block 401, the base station performs an LBT procedure to reserve access to one or more shared communication channels. For example, base station 105, under control of controller/processor 240, activates LBT procedure module 702, stored in memory 242. The execution environment of LBT procedure module 702 allows base station 105 to perform the LBT procedure to reserve access to one or more shared communication channels. The LBT rule for QCL antennas may be defined in various manners. The LBT procedure for a group of QCL'd antennas may result in one or more LBT results for each subgroup of antennas or even for individual antennas within the subgroups.

At block 402, the base station transmits a channel reservation preamble on the shared communication channels that were won in response to a successful LBT. As the base station determines a successful LBT, it may begin to transmit channel reservation signals on the one or more shared communication channels that were won during the contention process. For example, base station 105, under control of controller/processor 240, activates LBT success detector 703, stored in memory 242. The execution environment of LBT success detector 703 allows base station 105 to detect a successful LBT, and to transmit, via wireless radios 700a-t and antennas 234a-t, the channel reservation preamble on the shared communication channels in response to the success of the LBT procedure.

The concept of QCL as provided in aspects of the present disclosure may also apply to one or more antennas across multiple channels. In such cases, one or more antennas experiencing relatable interference across multiple channels may be said to be QCL across multiple channels for purposes of LBT procedures.

FIG. 4B is a block diagram illustrating example blocks executed to implement one aspect of the present disclosure. As noted above, the example blocks illustrated in FIG. 4B will also be described with respect to base station 105, as illustrated in FIG. 7. At block 403, a base station identifies at least one antenna of a plurality of antennas is QCL across multiple shared communication channels. The multiple shared channels may be separated by a certain frequency or within one or more bands. For example, base station 105, under control of controller/processor 240, activates QCL antenna identifier 704, stored in memory 242. The execution environment of QCL antenna identifier 704 allows base station 105 to identify at least one antenna of a plurality of antennas, e.g., antennas 234a-t, is QCL across multiple shared communication channels.

At block 404, the base station performs an LBT procedure to reserve access to the multiple shared communication channels. As discussed above, the LBT rule for QCL antennas may be defined in various manners, and a group of QCL'd antennas may yield one or more LBT results across the communication channels. For example, base station 105, under control of controller/processor 240, activates LBT procedure module 702, stored in memory 242. The execution environment of LBT procedure module 702 allows base station 105 to perform the LBT procedure to reserve access to the multiple shared communication channels.

At block 405, the base station transmits a channel reservation preamble on the multiple shared communication channels in response to success of the LBT procedure. As the base station determines a successful LBT, it may begin to transmit channel reservation signals on multiple shared communication channels that were won during the contention process. For example, base station 105, under control of controller/processor 240, activates LBT success detector 703, stored in memory 242. The execution environment of LBT success detector 703 allows base station 105 to detect a successful LBT, and to transmit, via wireless radios 700a-t and antennas 234a-t, the channel reservation preamble on the multiple shared communication channels in response to the success of the LBT procedure.

Figure 5:
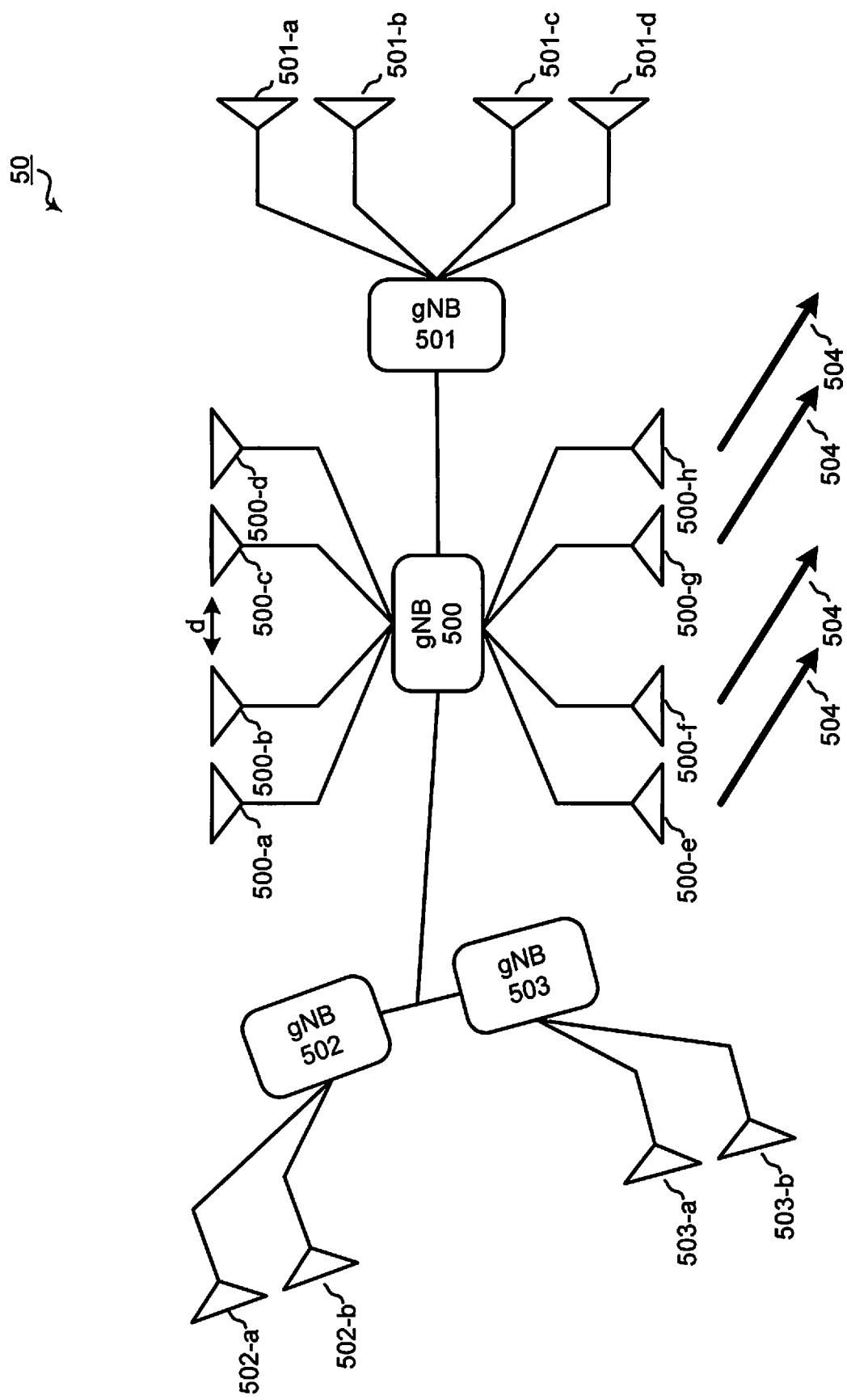
FIG. 5 is a block diagram illustrating a distributed antenna network configured according to one aspect of the present disclosure.

FIG. 5 is a block diagram illustrating a distributed antenna network 50 configured according to one aspect of the present disclosure. Various criteria may be used for defining antennas as QCL. For example, relative interference may be based on a distance, 'd', between antennas, on cross-correlation of energy levels between the antennas, on cross-correlation of per-antenna CCA results, on whether the antennas share the same or different angle of arrival (AoA) and angle of departure (AoD) (e.g., whether the antennas belong to the same panels and/or subarrays, or whether the two antenna panels point to the same or different directions). In operation, antennas 502-a and 502-b may be QCL, while antennas 503-a and 503-b are QCL, but not with antennas 502-a and 502-b because of the distance between the QCL antennas 502-a and 502-b and the QCL antennas 503-a and 503-b, even though they point in the same direction and are controlled by gNBs 502 and 503 connected via an ideal backhaul. In another example, antennas 502-a, 502-b, 503-a, and 503-b may be QCL based on experiencing similar interference or based on sharing the same AoA and AoD. In another example, antennas 503-a, 503-b, 500-e, and 500-f may be QCL based on cross-correlation of energy levels between the antennas.

Another example criteria of QCL rule may be based on physical/logical connection and LBT coupling. For example, such QCL rules may allow antennas to be declared QCL whenever they belong to the same entity (e.g. cell) on the same carrier or different carrier in the same band, whenever they belong to a coordinated area (e.g., coordinated multipoint (CoMP) coordination set), or as long as they can coherently coordinate to perform directional LBT. In example operation, antennas 500-a-500-d may be declared QCL because they belong to gNB 500 and are on the same carrier in the same band. Similarly, antennas 500-a, 500-b, 500-e, and 500-f may be declared QCL because the belong to gNB 500 and are on a different carrier in the same band. In another example, antennas 500-e-500-h and antennas 501-a-501-d are declared QCL because they are each part of a CoMP coordination set.

Another example criteria of QCL rule may be based on synchronization. For example, such QCL rules may allow QCL of antennas only if they are synchronized, or, conversely, if they are not synchronized, or if they do not share the same phase-locked loop (PLL) (e.g., due to geographic separation or being on different panels), or as long as their sensing window can be synchronized within a given time. In example operation, antennas 502-a, 502-b, 503-a, and 503-b may be QCL or not because they are synchronized because, while not synchronized, may be able to synchronize their sensing windows within a satisfactory threshold time. In another example, QCL antennas 502-a and 502-b may not be QCL with QCL antennas 503-a and 503-b because they are not synchronized or because they do not share the same PLL.

Within each of the different rule types for QCL definition, variations may be used for further controlling formation of the QCL groups and tying the group to LBT behaviors. In a narrow application, QCL could be defined as antennas that experience a similar interference level to one another. In such similar interference QCL groups, the grouped antennas act as a single entity for purposes of LBT and produce a single LBT result, as if they were a single antenna. Thus, antennas 501-a-501-d are declared QCL based on a similar interference rule. Each of antennas 501-a-501-d conduct LBT, but only a single result is reached. Therefore, if any one of antenna 501-a-501-d fail LBT, the entire similar interference QCL group fails LBT. The narrow application of this similar interference QCL grouping may be referred to herein as the Option A QCL definition.

In a broader sense, QCL could be defined as antennas that experience a correlated interference level. In such correlated interference QCL groups, the QCL antennas perform LBT jointly or in a correlated manner, but may produce multiple LBT results. For example, antennas 502-a, 502-b, 503-a, and 503-b are declared QCL based on a correlated interference between them. Each of antennas 502-a, 502-b, 503-a, and 503-b performs LBT. However, within the single QCL grouping, some of the antennas may pass, while others fail. Thus, in one example scenario, antennas 502-a and 502-b pass LBT and are, thus, allowed to transmit on the shared channel, while antennas 503-a and 503-b fail the LBT and do not transmit. The broader application of this correlated interference QCL grouping may be referred to herein as the Option B QCL definition.

In a still broader sense, QCL could be defined as antennas that have their LBT behaviors coupled together, regardless of the interference levels experienced by any of the antennas in the QCL group. Such QCL antennas may perform LBT jointly or in a correlated manner, but may produce multiple LBT results, as described above. For example, antennas

500-*a*-500-*h* are declared QCL as they perform LBT together. However, as the QCL definition allows different LBT results for the individual QCL antenna group members, if antennas 500-*e*-500-*f* were to pass LBT, while antennas 500-*a*-500-*d* were to fail, transmissions would be allowed on the shared channel from antennas 500-*e*-500-*f*, but not allowed from antennas 500-*a*-500-*d*. The still broader application of this behavior-coupled interference QCL grouping may be referred to herein as the Option C QCL definition.

In consideration of the various different rules defining QCL for antennas, different rules may also be applied in channel sensing for defining LBT behaviors. For example, in the Option A QCL definition, each antenna in an Option A QCL group jointly performs energy detection (ED)/power detection (PD) on the subject shared communication channel to produce a single LBT results for the entire Option A QCL group. Thus, if antennas 500-*a*-500-*d* are an Option A QCL group, if any one of antennas 500-*a*-500-*d* detects ED/PD above a threshold interference level, LBT for the entire Option A QCL group fails. In order to have a successful LBT, all of antennas 500-*a*-500-*d* of the Option A QCL group would fail to detect ED/PD above the threshold level.

For implementations using the Options B or using the Option C QCL definitions, the antennas of the QCL groups perform ED/PD jointly to produce a single or multiple LBT outcomes. Thus, depending on the implementation, the LBT procedure for Option B or C QCL groups may yield one or multiple LBT results. For example, antennas 500-*e*-500-*h* are part of an implementation using Option B QCL definitions. In a first optional operation, each of antennas 500-*e*-500-*h* are used for channel sensing. The energy of the shared communication channel is measured by averaging the detected energy over all of antennas 500-*e*-500-*h*. In such operation, the Option B QCL group of antennas 500-*e*-500-*d* may yield a single LBT results if the average detected energy across antennas 500-*e*-500-*d* exceeds the threshold interference. In another example operation, the Option B QCL group of antennas 500-*e*-500-*h* may perform PD either by non-coherently combining the received signals from all the QCL antennas 500-*e*-500-*h* or by coherently combining the received signals from all the QCL antennas 500-*e*-500-*h*, which may occur if the antennas share the same phase locked loop (PLL).

In an alternate aspect, antennas 501-*a*-501-*d* are part of an implementation using Option C QCL definitions. In an operational example, the Option C QCL group of antennas 501-*a*-501-*d* performs ED/PD at each of antennas 501-*a*-501-*d* or subgroup of antennas (e.g., antennas 501-*b* and 501-*c* as the primary set of antennas, and 501-*a* and 501-*d* as a secondary set of antennas), and the shared communication channel may be deemed unclean if at least at one antennas 501-*a*-501-*d* detects ED over the threshold or a preamble is detected on the channel. In another example operation, the Option C QCL group of antennas 501-*a*-501-*d* may perform PD either by non-coherently combining the received signals from all the QCL antennas 501-*a*-501-*d* or by coherently combining the received signals from all the QCL antennas 501-*a*-501-*d*, which may occur if the antennas share the same PLL.

Another example operation allows for spatial (directional) channel sensing across all the QCL antennas. For example, antennas 500-*e*-500-*h* are QCL and identified as a QCL group. All of antennas 500-*e*-500-*h* perform ED/PD along particular spatial direction, spatial direction 504, where spatial direction 504 may be coherently formed by all antennas 500-*e*-500-*h* in the QCL group. In this operational scenario, each individual antenna in the QCL group may experience interference at a level above the threshold, but as a group in spatial direction 504, antennas 500-*e*-500-*h* may experience an interference level below the threshold. In such case, the spatial LBT succeeds.

An additional option provides for the LBT rule to allow a subgroup of antennas in the QCL group (e.g., primary set of antennas 501-*b* and 501-*c*) to perform ED/PD on behalf of the remaining antennas of the QCL group (e.g., secondary set of antennas 501-*a* and 501-*d*). This may be useful when some of the remotely distributed antennas pose difficulty in real time channel sensing. For example, secondary set of antennas 501-*a* and 501-*d* have a slow connection (e.g., backhaul or over the air connection) to the primary set of antennas 501-*b* and 501-*c* to affect real time sensing. If the QCL group include the primary set of antennas 501-*b* and 501-*c* and the secondary set of antennas 501-*a* and 501-*d*, the primary set of antennas 501-*b* and 501-*c* perform LBT. If successful, the LBT is deemed to be successful for all the primary and secondary sets of antennas 501-*a*-501-*d*. In this case, the LBT outcome from the primary set of antennas 501-*b* and 501-*c* may be conveyed to the secondary set of antennas 501-*a* and 501-*d* via either backhaul or over-the-air.

It should be noted that, since, the LBT procedure for the primary set of antennas 501-*b* and 501-*c* is applied to all of the antennas 501-*a*-501-*d* of the QCL group, the ED threshold may be adjusted to account for this more aggressive LBT behavior.

An additional option provides for the LBT rule to allow correlated LBT between the primary set of antennas 501-*b* and 501-*c* and the secondary set of antennas 501-*a* and 501-*d* of the QCL group. Such an LBT rule could be applicable under either an Option B or Option C QCL group definition. In such example, the primary set of antennas 501-*b* and 501-*c* perform LBT. If the LBT is successful, then the secondary set of antennas 501-*a* and 501-*d* perform LBT. The LBT outcome of the primary set of antennas 501-*b* and 501-*c* could be conveyed to the secondary set of antennas 501-*a* and 501-*d* via either backhaul or over-the-air. The LBT is deemed to be successful/unsuccessful at each antenna subgroup based on the LBT results of the antenna subgroup. For example, LBT may be successful on the primary set of antennas 501-*b* and 501-*c* and unsuccessful on the secondary set of antennas 501-*a* and 501-*d*. In a further example, antennas 500-*a*-500-*d* may be part of the QCL group but identified as another secondary set of antennas. LBT may be successful on the primary set of antennas 501-*b* and 501-*c*, successful on the secondary set of antennas 501-*a* and 501-*d*, but unsuccessful on the secondary set of antennas 500-*a*-500-*d*.

An additional option provides for different LBT rules to be applied on primary and secondary antennas. For example a full LBT may be performed by the primary set of antennas 501-*b* and 501-*c*, while a simplified or short LBT (e.g., single shot CCA) may be performed at the secondary set of antennas 501-*a* and 501-*d*.

It should be noted that in additional operational aspects, different ED/PD thresholds may be applied at the different antenna subgroups. Thus, the ED/PD threshold at the primary set of antennas 501-*b* and 501-*c* may be different from the ED/PD threshold at the secondary set of antennas 501-*a* and 501-*d*.

When the antennas of a QCL group are divided into different subgroups, the transmission of the channel reservation preamble may be determined based on the antenna subgroup that participated in LBT. For example, under the QCL definition like Option A, where the primary set of antennas 501-*b* and 501-*c* perform LBT that will be applied to the secondary set of antennas 501-*a* and 501-*d* without the secondary set of antennas 501-*a* and 501-*d* performing LBT, the channel reservation preamble may be transmitted by the primary set of antennas 501-*b* and 501-*c*. Alternatively, the channel reservation preamble may be transmitted by all the antennas 501-*a*-501-*d* of the QCL group. In a further alternative, the channel reservation preamble may be transmitted by all of the antennas 501-*a*-501-*d* of the QCL group, but the primary set of antennas 501-*b* and 501-*c* transmits the channel reservation preamble at a first power level, while the secondary set of antennas 501-*a* and 501-*d* may be transmit the channel reservation preamble at a second power level that is different from the first power level.

Thus, where all of the antennas 501-*a*-501-*d* are involved in ED/PD of LBT, then, if successful, the channel reservation preamble is transmitted from all of the antennas 501-*a*-501-*d*. When only the primary set of antennas 501-*b* and 501-*c* is involved in ED/PD of LBT, then, if successful, the channel reservation preamble may be transmitted either from all of the antennas 501-*a*-501-*d* or from the primary set of antennas 501-*b* and 501-*c*.

Figure 6:
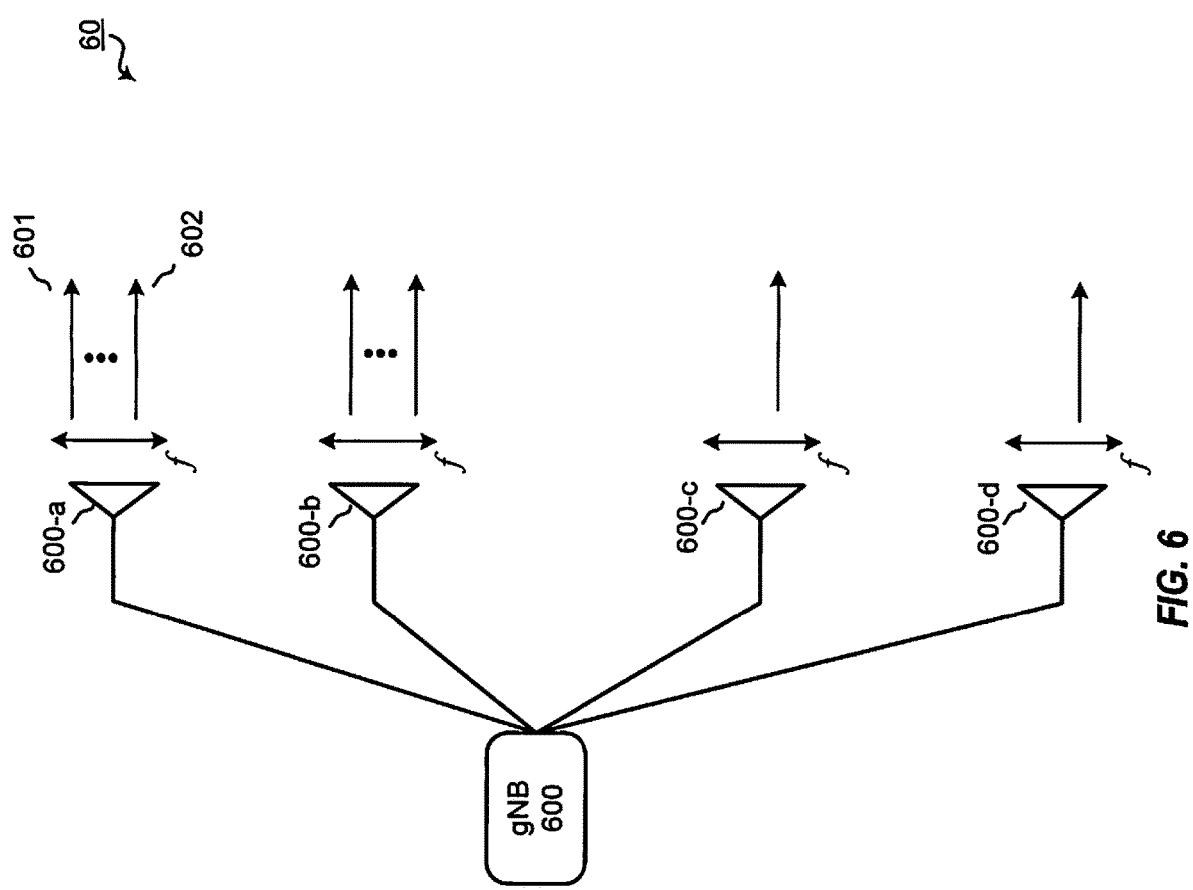
FIG. 6 is a block diagram illustrating distributed antenna network configured according to one aspect of the present disclosure.

FIG. 6 is a block diagram illustrating distributed antenna network 60 configured according to one aspect of the present disclosure. Distributed antenna network 60 is controlled by gNB 600. The notion of QCL for LBT can also be applied over multiple shared communication channels (e.g., cells, carriers). An antenna port on two channels may be considered QCL when the properties of the interference measured on one channel can be inferred from the interference measured on the other channel. For example, antenna 600-*a* may transmit over two shared channels 601 and 602. Antenna 600-*a* may be considered QCL over channels 601 and 602. The rule for QCL eligibility can be based on frequency separation of channels 601 and 602 or could be based on whether channels 601 and 602 belong to the same band or not. The interference experienced by antenna 600-*a* on channel 601 may have a relationship to the interference experienced by antennas 600-*a* on channel 602. Thus, similar rules applied for LBT across QCL'ed antennas may be defined for LBT across QCL'ed channels. For example, antenna 600-*a* may perform ED/PD for LBT on channel 601 (e.g. primary channel), and upon successful LBT, may be able to declare that LBT was successful on both channels 601 (primary channel) and 602 (secondary channel). Upon successful LBT, the preamble may be transmitted either from only 601 or from both 601 and 602. Alternatively, antenna 600-*a* may perform LBT by averaging the interference observed on channels 601 and 602 and declare that the LBT is successful if the average interference is below a threshold. The other antennas, antennas 600-*b*-600-*d*, may also experience similar interference on channels 601 and 602. Thus, each antenna of 600-*b*-600-*d* is QCL across 601 and 602. Furthermore, antennas 601-*a*-600-*d* may experience similar interference. Thus, the four antennas 601-*a*-600-*d* across the two channels 601 and 602 form a QCL group.

It should be noted that the various aspects discussed above regarding channel sensing and preamble transmission may apply for QCL group antennas for LBT over multiple channels except for the aspects related to coherent combining and spatial (directional) sensing, which are not applicable across multiple channels.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4A and 4B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   identifying, by a base station having a plurality of antennas, one or more groups of quasi-colocated (QCL) antennas of the plurality of antennas, wherein each of the one or more groups of QCL antennas include one or more antennas;
   performing, by the base station, a listen before talk (LBT) procedure to reserve access to one or more shared communication channels, wherein the identification of the one or more groups of QCL antennas is based on LBT behavior of the one or more antennas in each of the one or more groups of QCL antennas; and
   transmitting, by the base station, a channel reservation preamble on the one or more shared communication channels in response to success of the LBT procedure.

2. The method of claim 1, wherein the identifying includes:
   determining, by the base station, that a group of antennas of the one or more groups of QCL antennas are QCL, based on a similarity of interference experienced among the antennas in the group of antennas.

3. The method of claim 2, wherein the similarity of interference is determined according to one of:
   a distance between the antennas in the group of antennas;
   a cross-correlation of measured energy levels between the antennas in the group of antennas during clear channel assessments (CCA);
   a cross-correlation of results of CCA performed by the antennas in the group of antennas;
   a direction to which the antennas in the group of antennas are pointed.

4. The method of claim 1, wherein the identifying is further based on one of:
   a definable connection between the plurality of antennas; or
   synchronization of the plurality of antennas.

5. The method of claim 4, wherein the definable connection includes one of:
   a network entity to which each of the plurality of antennas belong;
   a coordination set of antennas to which any of the plurality of antennas belongs; or
   an ability of one or more antennas of the plurality of antennas to coherently coordinate with one or more other antennas of the plurality of antennas to perform a directional LBT procedure.

6. The method of claim 4, wherein the synchronization includes one of:
   one or more antennas of the plurality of antennas being synchronized by sharing a common clock source;
   the one or more antennas are not sharing the common clock source but are able to align their timing for a channel sensing within a predefined timing offset of one another.

7. The method of claim 4, wherein the identifying further includes one of:
   identifying the one or more groups of QCL antennas according to sets of similar interference antennas of the plurality of antennas having substantially similar interference, wherein the LBT procedure provides a single result for each QCL group of the one or more groups of QCL antennas; or
   identifying the one or more groups of QCL antennas according to sets of correlated interference antennas of the plurality of antennas experiencing correlated interference, wherein the LBT procedure provides one of: a single result for each QCL group, multiple results for each QCL group, or one result for one or more antenna subsets of the QCL group.

8. The method of claim 7, wherein the performing the LBT procedure includes one of:
   jointly performing, by each antenna of each group of the one or more groups of QCL antennas, interference detection on the one or more shared communication channels; or
   jointly performing, by each antenna of each group of the one or more groups of QCL antennas, directional interference detection in one or more spatial directions coherently formed by the each antenna of the each group.

9. The method of claim 8, wherein interference detection includes one or more of:

measuring energy on the one or more shared communication channels at the each antenna of the each group, and declaring interference detection when the energy measured on any one of the each antenna of the QCL group exceeds a predefined threshold interference;

measuring energy on the one or more shared communication channels at the each antenna of the each group, averaging the measured energy over the each antenna of the each group, and declaring interference detection when the averaged measured energy exceeds a predefined threshold interference;

performing preamble detection on the one or more shared communication channels at the each antenna of the each group, and declaring interference detection when a preamble is detected on any one of the each antenna of the QCL group;

performing preamble detection on the one or more shared communication channels by coherently or non-coherently combining received signals over the each antenna of the QCL group, and declaring interference detection when a preamble is detected.

10. The method of claim 7, wherein the performing the LBT procedure includes:
transmitting the channel reservation preamble by each antenna of an identified QCL group in response to the LBT procedure providing the single result for the identified QCL group; and
transmitting the channel reservation preamble by each antenna provided a successful result in response the LBT procedure providing multiple LBT results for the identified QCL group.

11. The method of claim 7, wherein the identifying further includes:
designating, by the base station, within at least one QCL group of the one or more groups of QCL antennas a primary set of antennas and one or more secondary sets of antennas.

12. The method of claim 11, wherein the performing the LBT procedure includes:
performing the LBT procedures by each antenna of the primary set of antennas, wherein the success of the LBT procedures of the primary set of antennas is applied to the one or more secondary sets of antennas.

13. The method of claim 11, wherein the performing the LBT procedure includes:
performing a first LBT procedure by each antenna of the primary set of antennas;
signaling, in response to a successful result of the first LBT procedure, the successful result to the one or more secondary sets of antennas; and
performing, in response to receiving the successful result, a second LBT procedure by each antenna of the one or more secondary sets of antennas.

14. The method of claim 11, wherein the performing the LBT procedure includes:
performing a first LBT procedure by each antenna of the primary set of antennas; and
performing a second LBT procedure by each antenna of the one or more secondary sets of antennas, wherein the second LBT procedure is different from the first LBT procedure.

15. The method of claim 14, wherein a first interference detection threshold for the first LBT procedure is different from a second interference detection threshold for the second LBT procedure.

16. The method of claim 11, wherein the performing the LBT procedure includes:
performing the LBT procedure by each antenna of the primary set of antennas,
wherein the transmitting the channel reservation preamble includes one of:
transmitting the channel reservation preamble by the primary set of antennas;
transmitting the channel reservation preamble by each antenna of the primary set of antennas and the one or more secondary set of antennas; or
transmitting the channel reservation preamble by the primary set of antennas at a first power level and the one or more secondary sets of antennas at a second power level, wherein the first power level is different from the second power level.

17. The method of claim 1, wherein the LBT behavior of the one or more antennas is determined either by:
measuring energy on the one or more shared communication channels at the one or more antennas in each group, and averaging the measured energy over at the one or more antennas in each group; or by
performing preamble detection on the one or more shared communication channels at the one or more antennas in each group.

18. The method of claim 17, wherein when the averaged measured energy exceeds a predefined threshold interference, declaring interference detection, and wherein when a preamble is detected on any one of the one or more antennas, declaring interference detection.

19. The method of claim 1, wherein the LBT procedure provides one of: a single result for each QCL group, multiple results for each QCL group, or one result for one or more antenna subsets of the QCL group.

20. A method of wireless communication, comprising:
identifying, by a base station having one or more antennas, at least one antenna of the one or more antennas that is quasi-colocated (QCL) across a plurality of shared communication channels;
performing, by the base station, a listen before talk (LBT) procedure to reserve access to the plurality of shared communication channels, wherein the identification that the at least one antenna that is QCL is based on the at least one antenna having LBT behaviors coupled together with another one of the one or more antennas; and
transmitting, by the base station, a channel reservation preamble on the plurality of shared communication channels in response to success of the LBT procedure, wherein the performing the LBT procedure includes jointly performing interference detection across the plurality of shared communication channels across which the at least one antenna is QCL.

21. The method of claim 20, wherein the identifying includes:
determining, by the base station, the at least one antenna is QCL across the plurality of shared communication channels based on a similarity of interference experienced by the at least one antenna over the plurality of shared communication channels.

22. The method of claim 21, wherein the similarity of interference is determined according to one of:
a frequency separation between the plurality of shared communication channels;
a band to which the plurality of shared communication channels belongs;
a cross-correlation of measured energy levels between the plurality of shared communication channels during clear channel assessments (CCA); or a cross-correlation of results of CCA performed across communication channels.

23. The method of claim 20, wherein the identifying further includes one of:
   identifying the at least one antenna based on the at least one antenna having substantially similar interference across the plurality of shared communication channels, wherein the LBT procedure provides a single result for the at least one antenna across the plurality of shared communication channels; or
   identifying the at least one antenna that is QCL based on the at least one antenna having substantially similar interference across the plurality of shared communication channels, wherein the LBT procedure provides one of: a single result for the at least one antenna across the plurality of shared communication channels, multiple results for the at least one antenna across the plurality of shared communication channels, or one result for one or more communication channel subsets of the plurality of shared communication channels, and wherein the identifying the at least one antenna is further based on one of: the at least one antenna experiencing correlated interference.

24. The method of claim 20, wherein interference detection includes one or more of:
   measuring energy on each of the plurality of shared communication channels across which the at least one antenna is QCL, and declaring interference detection when the energy measured on any of the plurality of shared communication channels exceeds a predefined threshold interference;
   measuring energy on each of the plurality of shared communication channels across which the at least one antenna is QCL, averaging the measured energy over the plurality of shared communication channels, and declaring interference detection when the averaged measured energy exceeds a predefined threshold interference; and
   performing preamble detection on each of the plurality of communication channels across which the at least one antenna is QCL, and declaring interference detection when a preamble is detected on any one of the plurality of shared communication channels.

25. The method of claim 23, wherein the performing the LBT procedure includes:
   transmitting the channel reservation preamble on every shared communication channel of the plurality of shared communication channels across which the at least one antenna is QCL in response to the LBT procedure providing the single result for the at least one antenna that is QCL across the plurality of shared communication channels; and
   transmitting the channel reservation preamble on each of the plurality of shared communication channels provided a successful result in response the LBT procedure providing multiple LBT results for the at least one antenna that is QCL.

26. The method of claim 23, wherein the identifying further includes:
   designating, by the base station, within the at least one antenna that is QCL, a primary set of channels and one or more secondary sets of channels.

27. The method of claim 26, wherein the performing the LBT procedure includes:
   performing the LBT procedure on each channel of the primary set of channels, wherein the success of the LBT procedures on the primary set of channels is applied to the one or more secondary sets of channels.

28. The method of claim 26, wherein the performing the LBT procedure includes:
   performing a first LBT procedure on each channel of the primary set of channels; and
   performing, in response to a successful result of the first LBT procedure, a second LBT procedure on each channel of the one or more secondary sets of channels.

29. The method of claim 26, wherein the performing the LBT procedure includes:
   performing a first LBT procedure on each channel of the primary set of channels; and
   performing a second LBT procedure on each antenna of the one or more secondary sets of channels, wherein the second LBT procedure is different from the first LBT procedure.

30. The method of claim 29, wherein a first interference detection threshold for the first LBT procedure is different from a second interference detection threshold for the second LBT procedure.

31. The method of claim 26, wherein the performing the LBT procedure includes:
   performing the LBT procedure each channel of the primary set of channels,
   wherein the transmitting the channel reservation preamble includes one of:
      transmitting the channel reservation preamble on the primary set of channels;
      transmitting the channel reservation preamble on each channel of the primary set of channels and the one or more secondary set of channels; or
      transmitting the channel reservation preamble on the primary set of channels at a first power level and the one or more secondary sets of channels at a second power level, wherein the first power level is different from the second power level.

* * * * *